United States Patent [19]

Metelits et al.

[11] Patent Number: 5,119,306
[45] Date of Patent: Jun. 2, 1992

[54] MAIL PIECE WEIGHT QUALITY CONTROL SYSTEM AND METHOD

[75] Inventors: Stanley E. Metelits, New York, N.Y.; Ronald P. Sansone, Weston, Conn.

[73] Assignee: Pitney Bowes Inc., Stamford, Conn.

[21] Appl. No.: 459,418

[22] Filed: Jan. 2, 1990

[51] Int. Cl.$^5$ .............................................. G07B 17/00
[52] U.S. Cl. .............................................. 364/464.02
[58] Field of Search ................... 364/464.02, 464.03, 364/478, 567, 568, 552

[56] References Cited

U.S. PATENT DOCUMENTS

| | | | |
|---|---|---|---|
| 4,516,209 | 5/1985 | Scribner | 364/464.03 |
| 4,639,873 | 1/1987 | Baggarly et al. | 364/478 X |
| 4,734,865 | 3/1988 | Scullion et al. | 364/478 |
| 4,800,505 | 1/1989 | Axelrod et al. | 364/478 |
| 4,908,768 | 3/1990 | Gelfer et al. | 364/478 X |
| 5,027,279 | 6/1991 | Gottlieb et al. | 364/478 |

Primary Examiner—Parshotam S. Lall
Assistant Examiner—Edward R. Cosimano
Attorney, Agent, or Firm—Peter Vrahotes; Melvin J. Scolnick; David E. Pitchenik

[57] ABSTRACT

This invention relates to a system for certifying the accuracy of postage payments based on the weights of mail pieces. The expected weight of each mail piece is determined and a mail processing unit receives data relative to the contents to be inserted into an envelope that together form the mail pieces. A high speed weighing scale is located downstream from the mail processing unit to receive the mail pieces after the mail processing unit has inserted selected materials into envelopes. A comparison is made between the expected weight of each mail piece and its measured weight. If the measured weight of a mail piece is found different than the actual weight beyond certain tolerances, it could be rejected. If a large number of mail pieces exhibit a divergence between the estimated weight and the actual weight, the mail processing unit will be disabled and an examination made to determine what caused the discrepancies in the weights. If there is correlation between the anticipated weights and the measured weights, the mail pieces are placed in trays or other suitable containers to be delivered to the Post Office. A history of mail runs and their accuracy with regard to weight is maintained for record purposes.

17 Claims, 3 Drawing Sheets

MAIL PIECE WEIGHT QUALITY CONTROL SYSTEM AND METHOD

RELATED CASES

Attention is directed to co-pending U.S. patent application Ser. No. 07/234,977 filed Aug. 23, 1988 and entitled METHOD AND APPARATUS FOR CATEGORIZING AND CERTIFYING MAIL; U.S. patent application Ser. No. 285,486 filed Dec. 16, 1988 and entitled CENTRALIZED MAIL USE DATA BASE; U.S. Pat. No. 4,949,272 filed Dec. 16, 1988 and entitled FLEXIBLE BILLING RATE FOR MAIL COMMUNICATION SYSTEMS; U.S. patent application Ser. No. 282,713 filed Dec. 13, 1988 and entitled APPARATUS AND METHOD FOR THE PROCESSING OF MAIL; and U.S. patent application Ser. No. 416,731 entitled MAILING SYSTEM WITH INFORMATION FEEDBACK.

BACKGROUND OF THE INVENTION

Throughout the history of the Post Office, there has been a gradual evolution whereby the Post Office encourages mailers to prepare their mail in such a way as to reduce the effort required on the part of the Post Office for processing such mail. As an inducement to the mailer to prepare the mail in such a manner so as to bring about faster mail delivery, the Post Office offers mailers a discount on such items as pre-sorted mail, printing of zip codes and pre-printed postal bar codes. Discounts are given also when the mail is produced in a manner allowing automatic processing with machines such as optical character recognition (OCR) sorters and bar code readers and sorters.

Even with the present reduced postage rates for presorted zip code mail and the like, the Post Office is experiencing difficulties in processing the mail, not only because of the ever increasing volume of mail that is required to be delivered, but also because a significant amount of mail presented to the Post Office does not have the required postage or may not meet the requirements of postal regulations. The mail pieces may not have sufficient postage because the anticipated weight of a mail piece could be greater than expected. In equipment for processing large amounts of mail, it is frequently a practice to determine the weight of inserts of a mail piece, and together with the anticipated weight of the envelope, the total weight of the mail piece is calculated and postage applied in accordance with that weight. The mail pieces are placed in trays and these trays are delivered to the Post Office. Frequently, weight errors and mail quantity errors occur and these errors cause insufficient postage payment that result in delays being experienced by the Post Office in processing the mail.

The Post Office has been seeking ways of having the mailers hardware and software certified to assure that the mail processing systems used are accurate as described in Memo to Mailers, August/September 1989, pp. 4 published by the United states Postal Services. In keeping with this endeavor, the Post Office has requested entities involved in the mailing business to provide solutions to the mail processing problems by using certification techniques that would assure the Post Office that mail received from the mailer has adequate postage.

SUMMARY OF THE INVENTION

In keeping with the need to certify mail processing equipment and the mail processed thereby, a system has been developed for determining the accuracy of estimated weights of mail pieces. The estimated weight of each mail piece is determined based upon a data processing unit receiving data relative to the contents to be inserted into an envelope by a mail processing unit to form the mail pieces. Inserts that are sent periodically generally weigh the same amount and the recipients generally receive mail with the same contents. For example, a telephone bill has a number of insert or pages but the individual pages generally weigh the same although the number of pages can vary. It will be appreciated that there are instances when periodic mailings will not have the same inserts from mailing to mailing or piece to piece.

A high speed weighing scale is located downstream from the mail processing unit to receive the mail pieces after the mail processing unit has inserted selected ones of inserts into envelopes to form the mail pieces. A comparison is then made between the expected weight of each mail piece and its measured weight. If the mail piece measured weight is found different than the actual weight beyond certain tolerances, it can either be rejected or arrangements can be made for paying additional postage to the post office to cover the short fall. When there are small differences in weights, the data in the data processing unit can be altered to correct the differences. If a large number of mail pieces exhibit a divergence between the estimated weight and the actual weight, the mail processing unit will be disabled and an examination made to determine what caused the large discrepancies in the weights. If there is correlation between the anticipated weights and the measured weights, then the mail pieces are placed in trays or other suitable containers to be delivered to the Post Office without the need of further action except to certify the correctness of the postage.

DETAILED DESCRIPTION OF THE PREFERRED EMBODIMENTS

Figure 1:
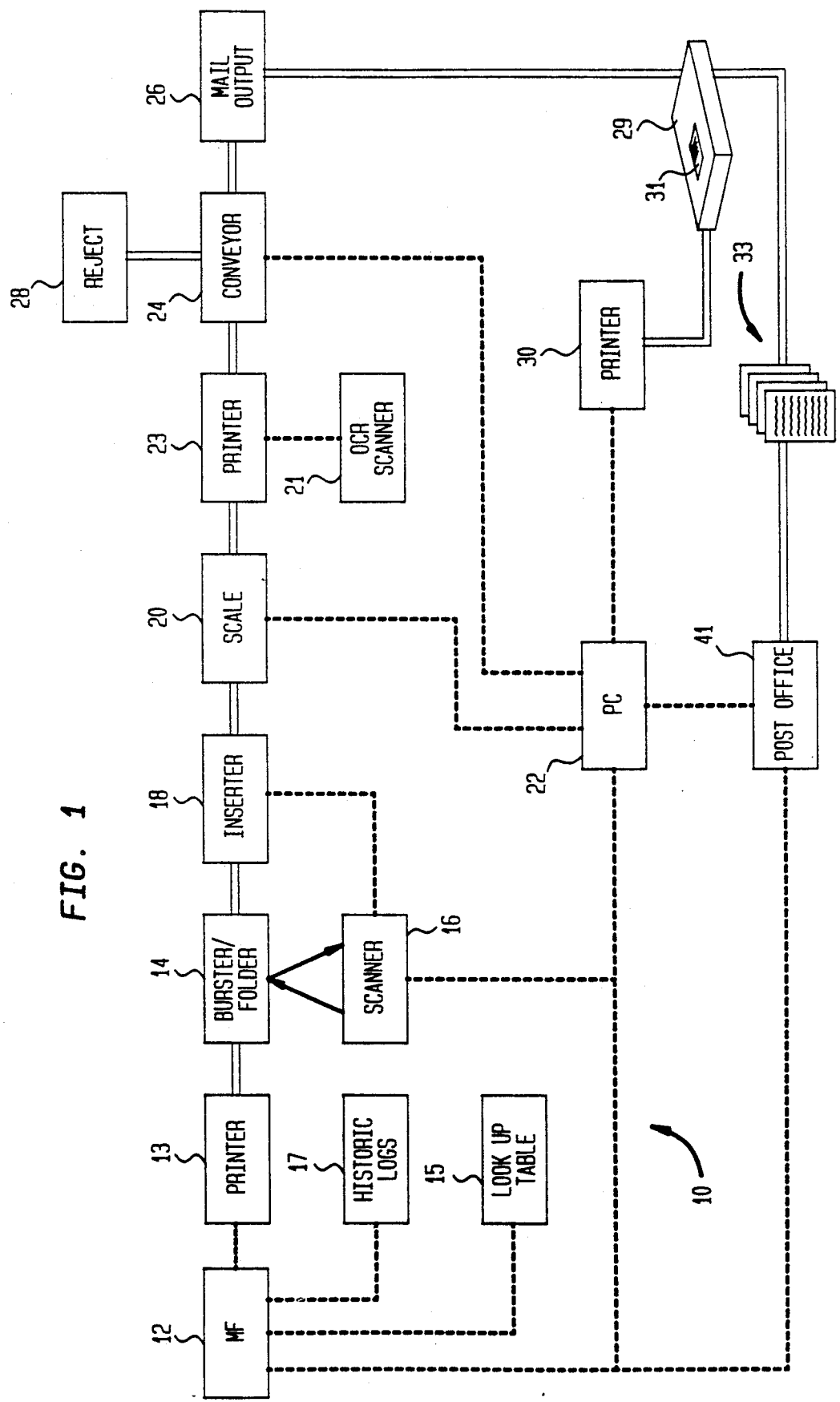
FIG. 1 is a block diagram of a system operative to carry out the instant invention.

With reference initially to FIG. 1, a mail piece weight quality control system is shown generally at 10 with the dash lines indicating electrical communication and the solid double lines indicating physical communication. A processor 12, which can be a main frame computer such as an IBM Model 3090-400 available from IBM Corporation is included in the system 10. Clearly, if less capacity is required a computer other than a mainframe can be used. The computer 12 has a look up table 15 and a history log 17. Downstream from the main frame 12 is a printer 13 such as a dot matrix printer or a high speed laser printer that is capable of receiving instructions from the main frame 12 for printing names and addresses in an address block and dash codes on computer fed sheets that can be in the form of a paper web. An example of such a printer is a Model 9300 laser printer available from Xerox Corp. This printer 13 will feed sheets to a burster/folder 14, such as a Model 3153 burster available from Pitney Bowes Inc, that will separate the paper web into sheets and fold the sheets for insertion into a windowed envelope with the addresses and dash codes exposed. Adjacent to the feeder 14 is a scanner 16 that scans the dash code. Downstream from the burster/folder 14 and in electrical communication with the scanner 16 is an inserter 18 that has a plurality of bins with inserts therein. The inserter receives sheets from the burster/folder 14 and data from the scanner 16 so as to select inserts that are to be placed into an envelope along with an appropriate sheet to form a mail piece also known as letter mail. Examples of inserters that be used for this purpose are Model No. 8300 series inserters available from Pitney Bowes Inc.

Downstream from the inserter 18 is a high speed scale 20 that is operative to receive mail pieces from the inserter and weigh the same quickly and accurately. An example of such a scale is shown and described in U.S. Pat. No. 4,778,018. A scale 20 of this type is able to determine the weight of a mail piece at the rate of two a second and with an accuracy of 0.001 ounces to at least 0.01 ounce. This allows the scale to not only process the mail pieces as quickly as the inserter 18 processes such mail pieces, but also has weight tolerances well within the limits of postal regulations for mail piece weights. The scale 20 is in electrical communication with a computer 22, the latter also being an electrical communication with the mainframe 12 and the scanner 16. The computer 22 can be a personal computer such as an IBM PC/2 model 50. Downstream from the scale 20 is an OCR scanner 21 that scans the address field of the mail piece. The OCR scanner 21 is in communication with a printer 23 that prints address bar codes on the mail piece in response to the reading of the address field. It will be appreciated that both the OCR scanner 21 and printer 23 are optional, as are other desirable features, and are not essential for the weight determination functions of the instant invention. A conveyor 24, which may be any of a number of commercially available conveyors, is downstream from the printer 23 for the purpose of delivering mail pieces to a mail output unit 26 which has trays 29 with labels 31 attached thereto for receiving the mail pieces that are to be sent to the Post Office 41. Also, downstream from the conveyor 24 is a reject bin 28 into which mail pieces with incorrect weights would be diverted. The labels 31 identify mail received within a tray 29. Finally, a printer 30 is in electrical communication with the computer 22, the printer being capable of printing report sheets 33 that also are to be sent to the Post Office 41.

In operation, a number of address lists and lists of material such as bills and advertisements, to be received by various recipients of mail will be stored in the look up table 15 of the main frame 12. Address and materials lists representative of a particular mail run will be selected by an operator. The weight of individual mail pieces that would result from the selected lists will be calculated based upon the called for contents, or materials, to be placed in an envelope to form a mail piece. The estimated weights of the individual sheets and inserts can be uploaded to the computer 22 from a number of sources such as manually by the operator through the keyboard, the scan code as received from the scanner 16 and from the main frame 12. Upon the input of the mail run selection to the mainframe 12, data will be submitted to the printer 13 and the printer will print the addresses and printed codes, usually in dash or bar format, on sheet webs and these sheet webs are fed to the burster/folder 14. The printer 13 can also print a bill, invoice, accounting summary, request letter and the like on different sheets of the web. More specifically, more than one sheet can be inserted into an envelope with different types of data on each sheet. At the burster/folder 14, three operations take place. The sheets are separated, or bursted, into individual sheets, the printed codes on the sheets are scanned by the scanner 16, and the sheets are folded. These codes will indicate what inserts are to be inserted into an envelope by the inserter 18. This information is conveyed by the scanner 16 to the inserter 14 as the sheets are being fed thereby.

After placing called for sheets and selected inserts into an envelope to thereby form a mail piece, the mail piece is conveyed to the scale 20 where the weight of each mail piece is measured. The measured weight of each mail piece is uploaded to the computer 22. The computer 22 will have received from the main frame 12 the estimated weights of each of the mail pieces and will make a comparison between the measured weights and the estimated weights of each mail piece to see if there is a correspondence. If there is no correspondence, the mailer will know that either the estimated weights are in need of revision, mail pieces are sticking together, or the number of inserts is incorrect. Based upon the results of this comparison, information will be supplied from the computer 22 to the conveyor 24, the latter receiving the mail pieces from the scale 20 after the weighing thereof. The conveyor 24 will then direct the mail pieces either to the mail output 26 to be collected in a tray, or the like, for delivery to the Post Office, or the mail pieces will be sent to the reject bin 28 as being out of weight. It should be noted at this point that the mailer will have the option of having the mail pieces sent to the mail output 26 if they are underweight since the Post Office 41 is willing to accept mail with excess postage thereon. It could be to the advantage of the mailer to have his mail processed with the excess postage rather than having to redirect the mail pieces. This is particularly true when the mailer is processing his mail in a presort discount mode. If the postage is deficient, it may be to the mailer's advantage to stop the run to correct the amount of postage to prevent a decrease in the number of mail pieces in a zip code group that could result in loss of the sortation discount. Nevertheless, the mailer will be in a position to recognize that he is paying more postage than required.

After a mail run has been made, assuming that there are not excessive rejects, the computer 22 will upload the information relative to the weights of the mail pieces and the comparisons to the processor 12. At this point, the processor 12 will do one of two things. It may either correct the data in memory so that future deliveries will be accurate, or it will retain the mail lists as originally stored if the discrepancies are of a minor nature. If the discrepancies are large, the mailer will have an indication the mail pieces are sticking together or the called for inserts have not been placed into envelopes as required. The operator can stop the operation to correct errors in the mail room before customer errors occur which could be expensive.

After a mail run and comparison has been completed, the computer will control the printer 30 to print a statement sheet 33, such as a Postal Form 3602, that contains a computation of required postal data for the benefit of the Post Office 41. This statement sheet will contain information relative to the mail pieces such as their weight, the discrepancies found, destinations and identification of the mailer, as well as a certification of the equipment that has processed the mail relative to the accuracy of the postage paid based upon the weight. This information will also be uploaded to the historic log 17 so that a history of the mailer's activities can be recorded. This allows a determination to be made as to the mailer's efficiency on long term basis. As the mailer demonstrates long term efficiencies, the Post Office 41 is in a position to more readily receive the mail with assurance of the accuracy relative to postage payment. It will be appreciated that the statement sheet containing the postal data can be in the form of recorded media such magnetic or optical disc or tapes.

Figure 2A:
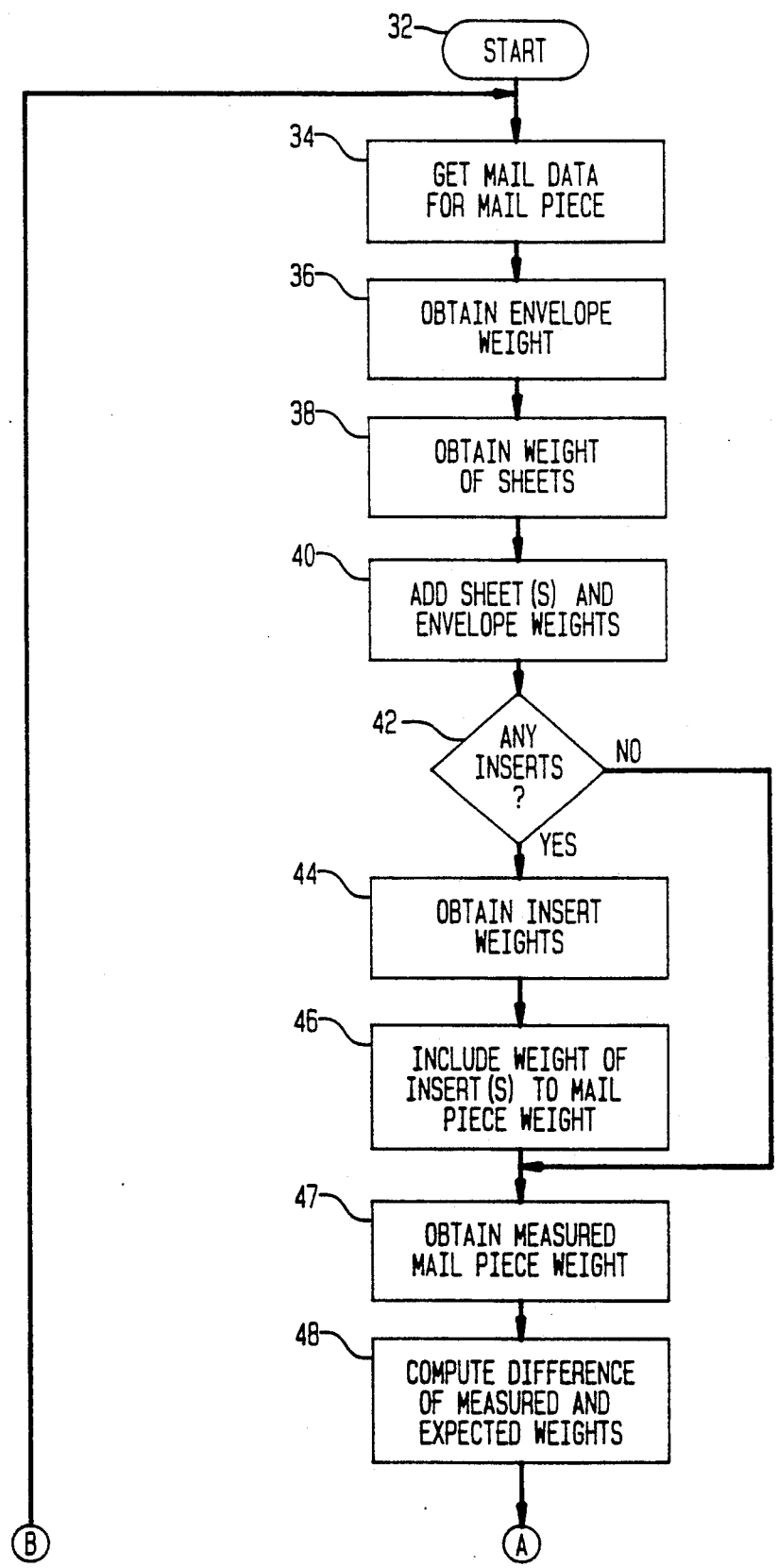
FIGS. 2A and 2B show a flow chart representative of a program for carrying out the instant invention.
Figure 2B:
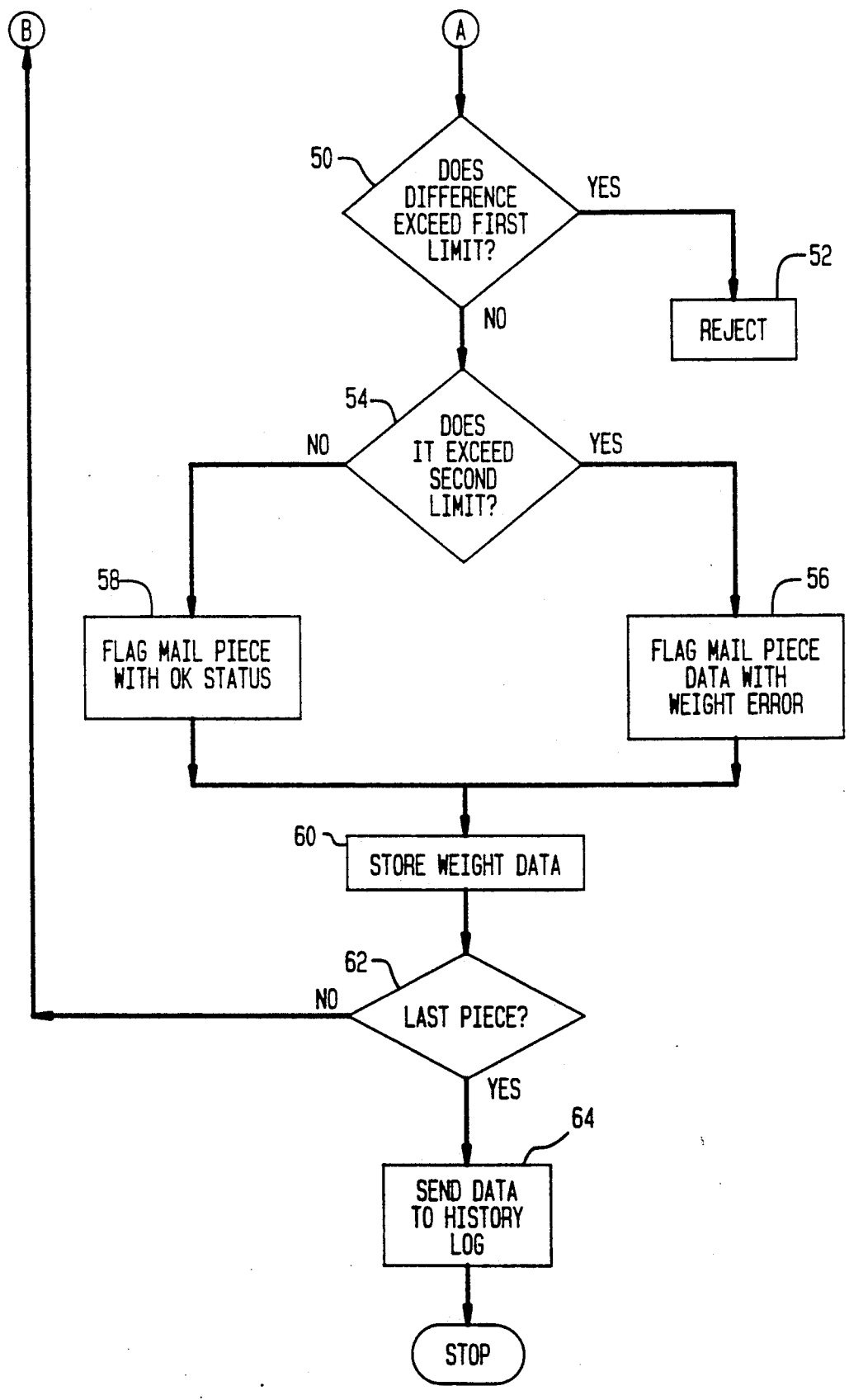

With reference to FIGS. 2A and B, the flow chart representative of the program for controlling the system 10 will be described. The system 10 is initiated 32 and the mail piece data for each mail piece is obtained 34 from the main frame look up table 15. The weight of the envelopes to be used is obtained 36 and then the weights of the address sheets to be inserted therein is obtained 38. The weight of the sheet or sheets is then added 40 to the weight of the envelopes on an individual basis to obtain a partial weight for each mail piece.

The question is then asked whether any inserts are to be place into an envelope 42. If the answer is yes, then the estimated weights of the inserts are obtained 44 and this obtained insert weight is added to the weight of the sheet(s) and envelope to obtain the weight calculated of the mail piece 46. Upon including the weight of the inserts, and if the answer to the inquiry as to whether there are any inserts is no, then the measured weight of the mail piece is obtained 47. The difference between the measured weight and estimated weight of the mail piece is then compared 48. An inquiry is then made as to whether the difference in these weights exceeds a first limit 50. If the answer is yes, the mail piece is sent to the reject bin 52. If the answer is no, then an inquiry is made whether the difference exceeds a second limit 54. The first limit is substantially greater than the second limit and exceeding the first limit would indicate that the weight of the mail piece is too great for the amount of postage applied too many inserts have been inserted or two or more mail pieces are sticking together. The second limit is a smaller limit indicating it is within tolerances with regard to postage, but there is a discrepancy in the weights. Also, the weight may be less than that required in terms of the postage applied, and the mail can be sent even though at a greater cost than necessary to the mailer. If the inquiry is no relative to the inquiry on the second limit, the mail piece is flagged with an okay status 58 and the weight data will be stored 60. If the answer is yes, the mail piece is flagged with a weight error status 56. The weight data is then stored 60 and an inquiry is made whether the last mail piece has been sent 62. If the last mail piece has not been sent, then the routine is repeated. If the last mail piece has been sent, the stored weight data is sent to the history log 64. Following the uploading of the data to the main frame 12, the routine is disabled.

There can be other tests that are made to determine if the weighing operation is accurate, such as a check of amplitude consistancy of the scale and frequency consistency, but such tests are not part of the instant invention and will not be described.

It will be appreciated that the above routine need not be carried out with every mail run. It is contemplated that the mail weight quality control will be performed occasionally, as required, to assure that the techniques used to estimate the weights of the mail pieces are reliable and that the equipment that is processing the mail is such that it performs in a manner so that sufficient postage is paid by the mailer. Periodically, the mailer will want to run the mail weight quality routine to assure that his procedures are reliable. Thus, what has been shown and described is a mail weight quality control system whereby the weight of mail pieces being processed by a mailer can be received by the Postal Service with assurance that the correct amount of postage has been paid for the same. This results in time savings for the Post Office who in turn would grant the mailer a discount for his mail on the basis of the time saved.

What is claimed is:

1. A mail piece weight quality control system wherein a weight quality control determination is made by comparing estimated weight for each mail piece with measured weight for that mail piece, comprising:
   a mail processing apparatus having means for storing a plurality of inserts, means for storing envelopes, and means for inserting selected ones of said inserts into envelopes to form mail pieces,
   a processor in communication with said mail processing apparatus for selecting the ones of said inserts to be inserted into envelopes to form mail pieces and for estimating the weight of an envelope and selected inserts inserted therein,
   a weighing scale for receiving mail pieces from said mail processing apparatus and obtaining measured mail piece weights,
   a computer in communication with said weighing scale and said processor, said computer having means for receiving estimated weight data from said processor for a mail piece and measured weight data from said scale of said mail piece, and means for comparing the estimated weight against the measured weight for said mail piece to make said weight quality control determination.

2. The system of claim 1 including a printer in communication with said computer, said printer having means for printing mail processing data on a statement sheet.

3. The system of claim 1 including a burster/folder located adjacent to said mail processing unit for feeding address sheets to said mail processing unit and a scanner adjacent to said burster/folder and having means for scanning said address sheets.

4. The system of claim 1 including a conveyor for conveying mail pieces from said weighing scale to one of two locations.

5. The system of claim 4 including a second printer having means for printing addresses and codes on said address sheets.

6. A mail processing system wherein a stream of items are processed to generate mail pieces and the difference between the estimated weight and measured weight of each mail piece is determined, comprising:
   a printer having means for printing upon sheets, a mail processing apparatus downstream from said printer and having means for storing a plurality of inserts, means for storing envelopes and means for inserting selected ones of said inserts and sheets from said printer into envelopes,
   a processor in communication with said mail processing apparatus for selecting the ones of said inserts to be inserted into envelopes to form mail pieces and having means for estimating the weight of mail pieces based upon the weight of the inserts and weight of the envelopes, a weighing scale for receiving a mail piece from said mail processing apparatus and measuring the weight of said mail pieces, a computer in communication with said weighing scale and said processor, said computer having means for receiving estimated weight data of said mail piece from said processor and measured weight data of said mail piece from said weighing scale, and means for comparing the estimated weight and the measured weight of said mail piece and obtaining a difference between the estimated and measured weights of said mail piece, and means for separating mail pieces whose measured weight is different from its estimated weight by a selected tolerance.

7. The system of claim 6 wherein said printer has means for feeding and printing addresses and codes upon a sheet web, a burster for bursting said sheet web, said burster being located intermediate said printer and said mail processing unit for feeding sheets individually to said mail processing unit and a scanner downstream from said burster and having means for scanning sheets being conveyed by said burster, said scanner being in communication with said mail processing unit to control the selection of inserts inserted into envelopes.

8. The system of claim 7 wherein said burster includes means for folding sheets.

9. The system of claim 7 including an OCR scanner located downstream from said weighing scale for reading addresses on said mail pieces and a second printer in communication with said computer and having means for printing bar codes on said mail pieces.

10. The system of claim 7 including a mail output unit located downstream from said weighing scale and having trays for receiving mail pieces.

11. The system of claim 10 including a third printer in communication with said sheet printing printer and having means for printing labels to be affixed to trays containing mail pieces.

12. A method of determining the accuracy of estimated mail piece weights, the steps comprising:

printing address information on sheets, inserting the sheets and selected inserts into an envelope, estimating the individual weights of the mail pieces, weighing each mail piece individually to obtain the measured weight to determine the accuracy of said mail piece estimated weight, setting a weight tolerance for difference between the estimated weights and measured weight, and segregating those mail pieces whose weight difference exceeds the tolerance.

13. The method of claim 12 including storing the difference between estimated weights and measured weights individually.

14. The method of claim 12 including the step of placing the mail pieces that exceed the weight tolerance in a reject bin and placing the mail pieces that are within the weight tolerance into trays.

15. The method of claim 14 including printing a statement sheet that contains data relative to the number of mail pieces that exceed the weight tolerance.

16. A method of determining the accuracy of an estimated weight for a mail piece, the steps comprising:

printing address information on sheets, inserting the sheets and selected inserts into an envelope, estimating the weight of a mail piece based upon the weight of the envelope and the inserts therein, weighting the mail piece to obtain the measured weight, comparing the estimated weight of the mail piece with its measured weight, and determining the difference between the estimated weight of the mail piece and the measured weight to determine the accuracy of the estimated mail piece weight.

17. The method of claim 16 including storing the difference between the estimated weight and the measured weight.

* * * * *